(12) United States Patent
Hofmann

(10) Patent No.: US 7,566,082 B2
(45) Date of Patent: Jul. 28, 2009

(54) COVERING FOR A LUGGAGE COMPARTMENT

(75) Inventor: Peter Hofmann, Neuhausen (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 16 days.

(21) Appl. No.: 11/879,062

(22) Filed: Jul. 16, 2007

(65) Prior Publication Data

US 2008/0012374 A1   Jan. 17, 2008

(30) Foreign Application Priority Data

Jul. 14, 2006   (DE) ........................ 10 2006 032 807

(51) Int. Cl.
*B60N 3/12* (2006.01)
(52) U.S. Cl. ................... 296/37.16; 296/37.14
(58) Field of Classification Search ............. 296/37.16, 296/37.8, 100.01, 26.04, 26.06, 100.14, 10
See application file for complete search history.

(56) References Cited

U.S. PATENT DOCUMENTS

| | | | | |
|---|---|---|---|---|
| 4,073,534 A * | 2/1978 | Hira | ................... | 296/37.16 |
| 4,202,578 A * | 5/1980 | Roullier et al. | .......... | 296/37.16 |
| 4,351,555 A * | 9/1982 | Hashimoto | ............... | 296/37.16 |
| 4,479,675 A * | 10/1984 | Zankl | ...................... | 296/37.16 |
| 4,648,648 A * | 3/1987 | Shigesada et al. | ........ | 296/37.16 |
| 4,728,141 A * | 3/1988 | Motozawa et al. | ....... | 296/37.16 |
| 5,011,208 A * | 4/1991 | Lewallen | ................. | 296/37.16 |
| 5,037,154 A * | 8/1991 | Senba et al. | ............. | 296/37.16 |
| 5,056,846 A * | 10/1991 | Tanaka | ...................... | 296/37.1 |
| 5,061,002 A * | 10/1991 | Saso | ........................ | 296/37.3 |
| 5,257,846 A * | 11/1993 | Kanai et al. | .............. | 296/37.16 |
| 5,324,089 A * | 6/1994 | Schlachter | .................. | 296/37.5 |
| 5,598,962 A * | 2/1997 | Schlachter | .................. | 224/542 |
| 5,799,845 A * | 9/1998 | Matsushita | ................. | 296/37.2 |
| 6,050,202 A * | 4/2000 | Thompson | ............... | 296/37.16 |
| 6,247,741 B1* | 6/2001 | Seel et al. | ................ | 296/37.14 |
| 6,318,782 B1* | 11/2001 | Suzuki et al. | ............ | 296/37.16 |
| 6,695,380 B1* | 2/2004 | Hicks | ...................... | 296/37.14 |
| 6,811,196 B2* | 11/2004 | Gammon | .................... | 296/37.1 |
| 7,059,646 B1* | 6/2006 | DeLong et al. | .......... | 296/37.16 |
| 7,188,881 B1* | 3/2007 | Sturt et al. | ................ | 296/26.09 |
| 7,216,916 B2* | 5/2007 | Czerwinski et al. | .......... | 296/66 |
| 7,393,037 B2* | 7/2008 | Hwang | ..................... | 296/37.14 |
| 2001/0040382 A1* | 11/2001 | Nemoto | .................... | 296/37.14 |
| 2003/0090120 A1* | 5/2003 | Barber et al. | ............. | 296/37.14 |
| 2007/0120391 A1* | 5/2007 | Hori et al. | ................. | 296/37.16 |

FOREIGN PATENT DOCUMENTS

| | | |
|---|---|---|
| DE | 35 12 974 C2 | 10/1985 |
| DE | 100 07 137 A1 | 8/2000 |
| DE | 20 2005 009 428 U1 | 11/2005 |
| FR | 2 588 809 | 4/1987 |
| FR | 2 834 677 | 7/2003 |
| FR | 2 848 939 | 6/2004 |
| FR | 2 886 902 | 12/2006 |
| FR | 2 887 199 | 12/2006 |
| JP | 4237649 A | 8/1992 |

* cited by examiner

*Primary Examiner*—Kiran B. Patel

(57) ABSTRACT

A covering for a luggage compartment in the passenger compartment of a motor vehicle between a backrest and a tailgate can be fitted in two fitting positions. Regardless of the selected fitting position, the covering is mounted such that it can pivot about a front edge, as seen in the direction of travel, and can be operatively connected to the tailgate at a rear edge, as seen in the direction of travel.

7 Claims, 2 Drawing Sheets

COVERING FOR A LUGGAGE COMPARTMENT

CROSS-REFERENCE TO RELATED APPLICATION

This application claims the priority, under 35 U.S.C. § 119, of German application DE 10 2006 032 807.8, filed Jul. 14, 2006; the prior application is herewith incorporated by reference in its entirety.

BACKGROUND OF THE INVENTION

Field of the Invention

The present invention lies in the automotive technology field. More specifically, the invention relates to a covering for a luggage compartment situated in the passenger compartment of a motor vehicle between a backrest and a tailgate. The covering can be fitted in two fitting positions, namely in a first fitting position, in which a surface of the covering faces upward, and in a second fitting position, in which the covering is rotated through approximately 180° about an axis running in the transverse direction of the vehicle such that the upper side now faces downward.

German patent DE 35 12 974 C2 describes a covering for a luggage compartment situated in the passenger compartment of a motor vehicle between a rear seat back and a tailgate, the covering being of trough-shaped design and being supported with the trough edges on the vehicle. In order to be able to vary the luggage compartment volume, the covering can be fitted either with its opening upward or downward such that, in both fitting positions, the luggage compartment interior is concealed. The covering, rotated through approx. 180° about an axis running in the transverse direction of the vehicle, can therefore be fitted either in a first or in a second fitting position.

German published patent application DE 100 07 137 A1 describes a device for accommodating and for transporting objects in the luggage compartment of a passenger vehicle, in which a frame formed from two lateral frame parts running transversely can be supported on its two lateral frame parts in the luggage compartment. The frame serves here as a support for one or more containers for receiving objects. Different types of containers, nets or other types of bases can be inserted into the frame.

French published patent application FR 2 834 677 discloses a removable rear parcel shelf for a motor vehicle, which firstly forms a trough and secondly can be fitted in two different fitting positions each rotated through 180°. In this case, the removable rear parcel shelf is guided in both fitting positions by means of its lateral edges in associated rails arranged on the vehicle.

Further coverings are known, for example, from German utility model DE 20 2005 009 428 U1 and French published patent application FR 2 848 939.

A frequent disadvantage of the prior art coverings is that they have to be fitted, in particular pushed, into their different fitting positions in an awkward manner.

SUMMARY OF THE INVENTION

It is accordingly an object of the invention to provide a covering for a luggage compartment, which overcomes the above-mentioned disadvantages of the heretofore-known devices and methods of this general type and which can be fitted in a simple manner in both fitting positions and at the same time in both fitting positions permits simple access to the luggage compartment located below it.

With the foregoing and other objects in view there is provided, in accordance with the invention, a covering assembly for a luggage compartment between a backrest and a tailgate of a motor vehicle, comprising:

a covering displaceably mounted to be fitted in a first position, in which a given surface of the covering faces upward, and in a second position, in which the covering is rotated through approximately 180° about an axis running in a transverse direction of the motor vehicle relative to the first position and the given surface now faces downward;

wherein said covering, regardless of whether said covering is mounted in said first position or in said second position:

is pivotally mounted on the motor vehicle about a front edge thereof, as seen in the direction of travel; and is configured to be operatively connected to the tailgate at a rear edge thereof, as seen in the direction of travel.

The invention is based on the general concept of providing a reversible rear parcel shelf which can be fitted in two different fitting positions between a backrest and a tailgate and which is mounted on the vehicle such that it can pivot about its front edge in both fitting positions and can be operatively connected by its rear edge to the tailgate. The pivotable mounting about the front edge of the covering together with the coupling of the rear edge of the covering to the tailgate permits the covering, irrespective of its fitting position, to be able to be opened simultaneously with the tailgate and, as a result, to release access to the luggage compartment located below it. Conversion between the two fitting positions can be carried out rapidly and simply, and therefore the trunk volume can easily be adapted to changed requirements. The two opposite edges of the covering, i.e. the front and the rear edge, are designed in such a manner that, together with a correspondingly designed receptacle on the vehicle, they form a hinge.

In an advantageous embodiment of the solution according to the invention, the covering has a J-shaped longitudinal section with a bent-over end region. This bent-over end region brings about, firstly, an additional stiffening of the covering and, secondly, a significantly differently sized luggage compartment volume depending on the selected fitting position. In the first fitting position, the bent-over end region is positioned at a rear end of the covering in the direction of travel and at the same time faces upward in the direction of the tailgate, and therefore a significantly larger feeling of empty rear space can be imparted to the vehicle occupants while, in the second fitting position, the bent-over end region is arranged on a front edge of the covering and faces downward, as a result of which the luggage compartment located below the covering can be significantly enlarged.

The covering, on the edge region opposite the bent-over end region, expediently has an edge which is bent over in the opposite direction to said edge region. In this case, both edges are designed in such a manner that they engage, in their respectively associated fitting position, in a channel on the vehicle and, as a result, form a hinge with the channel on the vehicle. The two edges of the covering therefore form an interchangeable hinge for the covering.

In an advantageous development of the invention, irrespective of its fitting position, the covering is supported at least in punctiform manner at its lateral edges on the motor vehicle. This affords the advantage that the covering is supported on three edges of the motor vehicle both in its first and in its second fitting position and, as a result, firstly rests on the motor vehicle with little vibration and, secondly, in particular in its first fitting position, permits safe depositing of objects on the covering.

The covering expediently has at least one trough-like depression. The trough-like depression is closed downward, i.e. toward the luggage compartment, in the first fitting position of the covering, and therefore, in this first fitting position, at least relatively small objects, secured against slipping, can be transported in the depression. By contrast, in the second fitting position, the trough-like depression enlarges the luggage compartment volume available below the covering.

In accordance with a concomitant feature of the invention, when the tailgate of the motor vehicle is open, the covering is pivotable about the front edge through approx. 35° in comparison to the closed tailgate. Preferably, with the tailgate open and the covering pivoted, a loading opening with a clear width of at least 580 mm is formed.

Other features which are considered as characteristic for the invention are set forth in the appended claims.

Although the invention is illustrated and described herein as embodied in covering for a luggage compartment, it is nevertheless not intended to be limited to the details shown, since various modifications and structural changes may be made therein without departing from the spirit of the invention and within the scope and range of equivalents of the claims.

It will be understood that the features mentioned above and those which have yet to be explained below can be used not only in the respectively stated combination but also in other combinations or on their own without departing from the scope of the present invention.

The construction and method of operation of the invention, together with additional objects and advantages thereof will be best understood from the following description of specific embodiments when read in connection with the accompanying drawings.

DETAILED DESCRIPTION OF THE INVENTION

Figure 1:
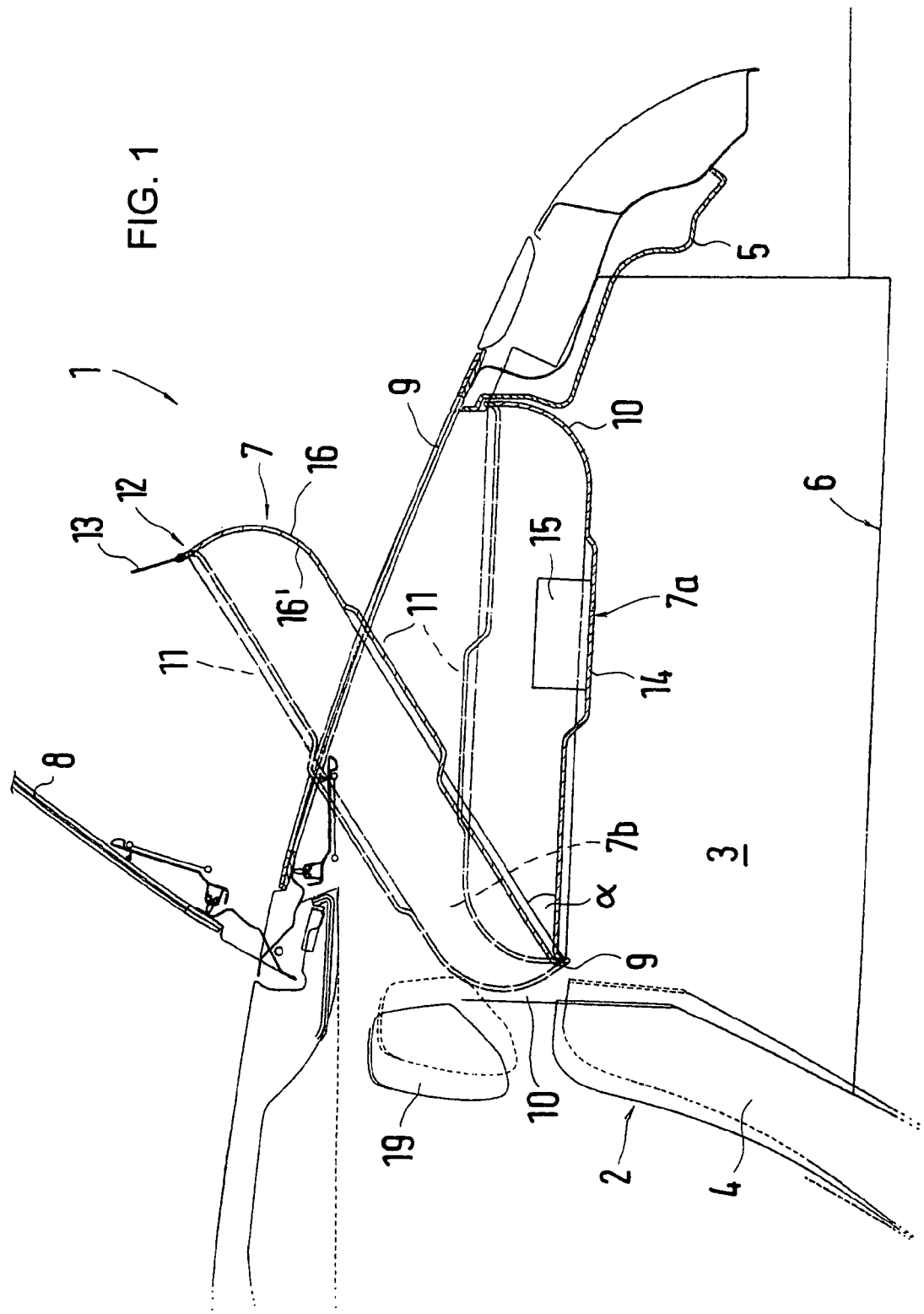
FIG. 1 is a longitudinal section taken through a rear part of a motor vehicle with a covering according to the invention.

Referring now to the figures of the drawing in detail and first, particularly, to FIG. 1 thereof, a motor vehicle 1, of which only a rear end region is illustrated, has a rear seat row 2 with a luggage compartment 3 arranged behind it in the direction of travel. The luggage compartment 3 therefore extends in the longitudinal direction of the motor vehicle 1 between a seat back 4 of the rear seat row 2 and a rear interior lining 5 of the luggage compartment 3. In the vertical direction, the luggage compartment 3 extends from a lower luggage compartment floor 6 as far as a covering 7 delimiting the luggage compartment 3 upward.

The covering 7 can be fitted according to the invention either in a first fitting position 7a or in a second fitting position 7b. The first fitting position 7a is illustrated in FIG. 1 by a solid line while the second fitting position 7b is illustrated by a broken line. In the first fitting position 7a, the size of the passenger compartment is larger and there is a larger distance between the covering 7 and a tailgate 8 arranged above it. This imparts a pleasant and generous feeling of interior space.

By contrast, with the covering 7 fitted in the second fitting position 7b, the volume of the luggage compartment 3 located below the covering 7 is enlarged. A change between the two fitting positions 7a and 7b can be achieved by rotation of the covering 7 through 180° about an axis running in the transverse direction of the vehicle. According to the invention, irrespective of the selected fitting position 7a or 7b, the covering 7 is mounted on the motor vehicle 1 in a manner such that it can pivot about a front edge 9 of the covering 7, as seen in the direction of travel, and is operatively connected at its rear edge 12 to the tailgate 8. Furthermore, the covering 7 is preferably of panel-shaped design.

The different luggage compartment volume of the luggage compartment 3 in a different fitting position 7a or 7b results from a J-shaped longitudinal section of the covering 7 with a bent-over end region 10. In the first fitting position 7a, the bent-over end region 10 is at the rear, as seen in the direction of travel, while, in the fitting position 7b, this bent-over end region 10 is arranged at the front, as seen in the direction of travel. Depending on the fitting position 7a or 7b, an essentially rectilinear section 11 of the covering 7 is also arranged either lower down or higher up, as a result of which the luggage compartment volume of the luggage compartment 3 is affected. As can furthermore be gathered from FIG. 1, the covering 7, on the edge opposite the bent-over end region 10, has an edge which is bent over in the opposite direction and, in the fitting position 7a, forms the front edge 9 while, in the fitting position 7b, it forms the rear edge 12 of the covering 7. The two edges 9, 12 are designed in such a manner that they interact with a channel on the vehicle that is preferably designed in a complementary manner to them and, as a result, form a hinge function with the motor vehicle 1. Irrespective of its fitting position 7a or 7b, the covering 7 can be pivoted as a result at its front edge 9 about an axis which runs in the transverse direction of the vehicle and, according to FIG. 1, runs essentially orthogonally to the plane of the figure.

Irrespective of its fitting position 7a or 7b, the covering 7 is connected at its rear edge 12 to the tailgate 8 via tension elements 13, therefore opening of the tailgate 8 also brings about an opening of the covering 7, i.e. a pivoting of the same about its front edge 9. When the tailgate 8 is closed, the covering 7 is also in a position in which it upwardly closes the luggage compartment 3 while, when the tailgate 8 is open and the covering 7 is open, a loading opening making the luggage compartment 3 accessible is released by said covering. When tension elements 13 are connected to the tailgate 8, the covering 7 is pivoted through an angle of rotation a of approx. 35° between closed and open tailgate 8, which, when the tailgate 8 is open and the covering 7 pivoted, results in a clear width of a loading opening of at least 580 mm. In this case, the clear width of the loading opening with the covering 7 in the fitting position 7b, according to FIG. 1, is larger than with the covering 7 in the fitting position 7a.

It can likewise be gathered from FIG. 1 that the covering 7 has, in the region of its essentially rectilinear section 11, a small trough-like depression 14 which, in the fitting position 7a, is downwardly closed and at least makes it difficult for objects 15 mounted on the covering 7 to slip.

Of course, it is also conceivable that opposite sides 16 and 16', i.e. surfaces of the covering 7, are designed or configured differently, thus resulting in a different design depending on the fitting position 7a or 7b.

Figure 2A:
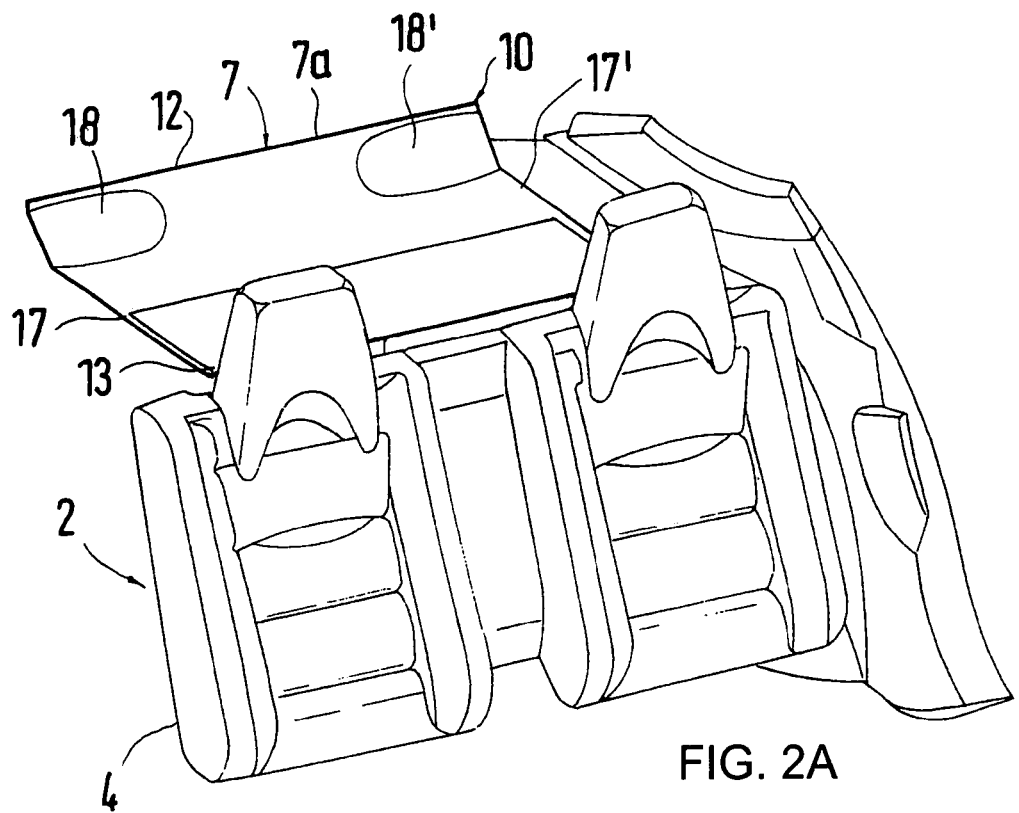
FIG. 2a is a perspective view of a rear seat row of a motor vehicle with a covering in its first fitting position.
Figure 2B:
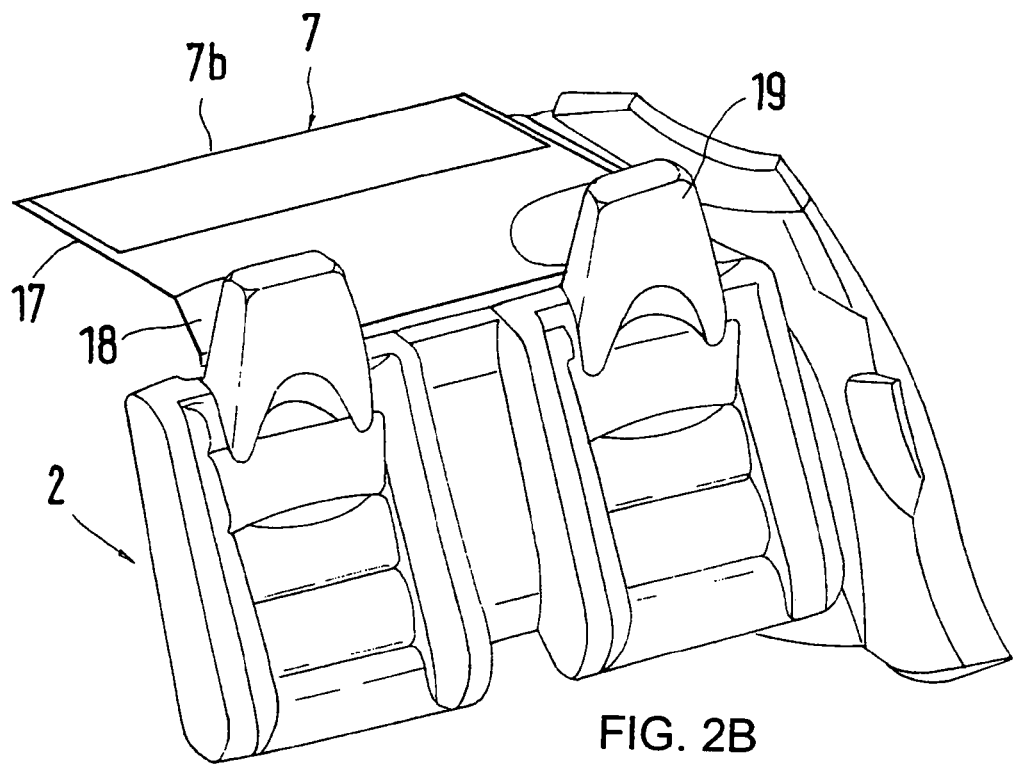
FIG. 2b is a similar view showing the covering in its second fitting position.

FIG. 2a shows the covering 7 in its first fitting position 7a, in which a passenger compartment is larger in comparison to the second fitting position 7b shown in FIG. 2. By contrast, the luggage compartment 3 arranged below the covering 7 is larger in the fitting position 7b, shown in FIG. 2b, of the covering 7 than in FIG. 2a. Furthermore, it can be gathered from FIGS. 2a and 2b that indentations 18 and 18' are provided in the bent-over end region 10 of the covering 7, said indentations 18, 18', in the fitting position 7b according to FIG. 2b, being arranged in such a manner that an opening movement of the covering 7 is not obstructed by head restraints 19.

As mentioned above, FIG. 2a shows the covering 7 in its first fitting position 7a, in which the bent-over end region 10 is arranged at the rear, as seen in the direction of travel, i.e. in a position remote from the seat back 4, and faces in the direction of the tailgate 8, thus making it possible to deposit objects 15 on the covering 7. In this case, the covering 7 is mounted on the motor vehicle 1 at least in a punctiform manner along its lateral edges 17, 17', as a result of which the covering 7 is reliably supported and deformation of the covering 7 is limited even if relatively heavy objects 15 are deposited on the covering 7. A similar support of the covering 7 is also provided in its second fitting position 7b.

The invention claimed is:

1. A covering assembly for a luggage compartment between a backrest and a tailgate of a motor vehicle, comprising:
    a covering displaceably mounted to be fitted in a first position, in which a given surface of the covering faces upward, and in a second position, in which the covering is rotated through approximately 180° about an axis running in a transverse direction of the motor vehicle relative to the first position and the given surface now faces downward, said covering having a J-shaped longitudinal section with a bent-over end region,wherein in the first position said bent-over region faces upward towards the tailgate and is disposed at a rear end of said covering in a direction of travel and in the second position, said bent-over region faces downward and is disposed at a front end of said covering in the direction of travel;
    wherein said covering, regardless of whether said covering is mounted in said first position or in said second position:
        is pivotally mounted on the motor vehicle about a front edge thereof, as seen in the direction of travel; and
        is configured to be operatively connected to the tailgate at a rear edge thereof, as seen in the direction of travel.

2. The covering assembly according to claim 1, wherein said covering, on an edge region opposite said bent-over end region, has an edge bent over in an opposite direction with respect to said edge region.

3. The covering assembly according to claim 1, wherein, regardless of the fitting position thereof, said covering is supported at least in punctiform manner at lateral edges thereof on the motor vehicle.

4. The covering assembly according to claim 1, wherein, regardless of the fitting position thereof, the rear edge of said covering is connected to the tailgate via tension elements.

5. The covering assembly according to claim 1, wherein said covering is formed with at least one trough depression.

6. The covering assembly according to claim 1, wherein, when the tailgate of the motor vehicle is open, said covering is pivotable about the front edge through approx. 35° in comparison to the closed tailgate.

7. The covering assembly according to claim 1, wherein, when the tailgate of the motor vehicle is open and said covering pivoted, a loading opening with a clear width of at least 580 mm is formed.

* * * * *